(No Model.)
J. PAOLI.
LEVELING INSTRUMENT FOR BUILDERS.
No. 461,390. Patented Oct. 13, 1891.
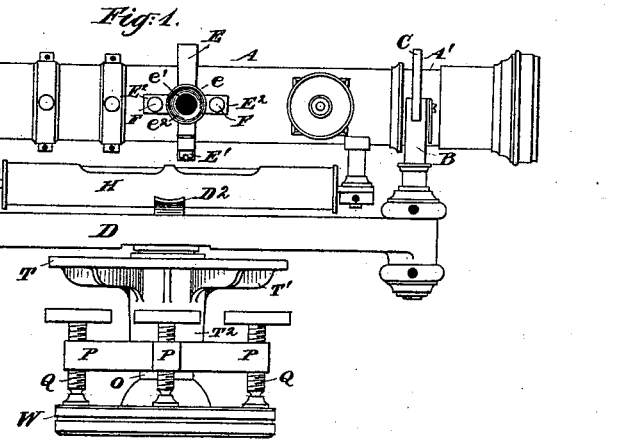
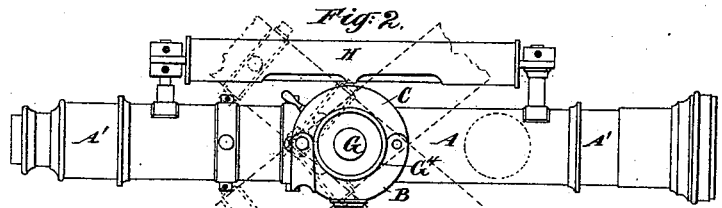
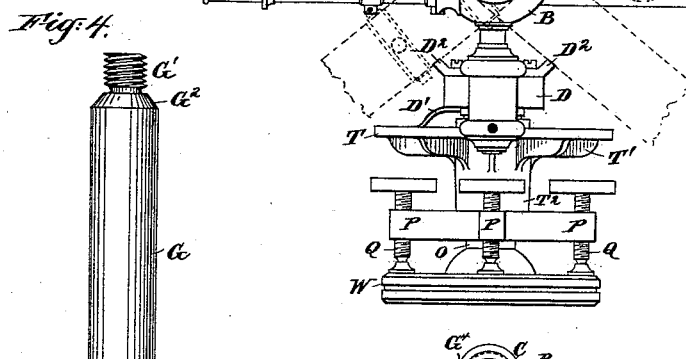
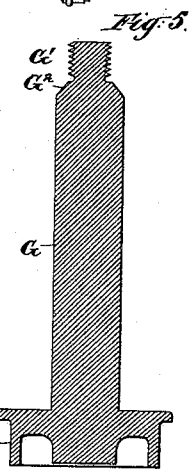
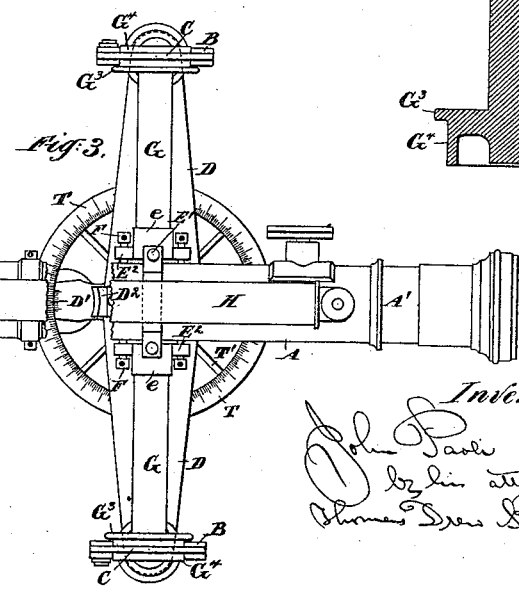
Witnesses:
Charles R. Searle,
H. A. Johnstone.
Inventor:
John Paoli
by his attorneys
Thomas Drew Stetson

UNITED STATES PATENT OFFICE.

JOHN PAOLI, OF HOBOKEN, NEW JERSEY.

LEVELING-INSTRUMENT FOR BUILDERS.

SPECIFICATION forming part of Letters Patent No. 461,390, dated October 13, 1891.

Application filed March 17, 1891. Serial No. 385,335. (No model.)

*To all whom it may concern:*

Be it known that I, JOHN PAOLI, a subject of the King of Italy, residing in Hoboken, Hudson county, in the State of New Jersey, have invented a certain new and useful Improvement in Builders' Levels, of which the following is a specification.

I have successfully introduced into the builder's level provisions for allowing it to serve usefully in testing vertical lines and in measuring the horizontal angles between objects at different levels. My instrument combines in a degree the qualities of a theodolite or transit instrument with a builders' level.

The well-known builder's level used in constructing buildings, bridges, and other works is adapted to work with a long telescope and a long leveling-tube; and to attain greater refinement and convenience in accurate leveling than can be had with the necessarily shorter tubes in the transit instrument, I provide means for changing the condition of a single telescope, so that it may serve alternately at will in one adjustment as a level, with the ordinary powers and accuracy of the builder's level, and then, by a change in the conditions effected with little expenditure of labor and requiring little skill, the same telescope is adapted to be inclined upward and downward through a considerable range, and to determine vertical lines and to measure angles between objects at different levels with an accuracy closely approximating that of the transit instrument. To attain this, the telescope is provided with long trunnions at right angles to its axis, each having a large bearing which matches in the supports. In what I esteem the most complete means of carrying out the invention these trunnions are removable, so that when the instrument is adjusted to serve as a level the trunnions will be not only out of use, but may be removed and stowed away until wanted.

The accompanying drawings form a part of this specification, and represent what I consider the best means of carrying out the invention.

Figure 1 is a side elevation showing the instrument adjusted for leveling. Fig. 2 is a corresponding side elevation with the parts adjusted to serve as a transit. In this view the telescope has been lifted out of its bearings and retained in the same direction as in Fig. 1, but inverted, so that the level is raised out of the way and has become ineffective. The part which supports the telescope, corresponding to the alidade in the ordinary transit, has been turned at an angle of ninety degrees, so that it is presented in end view. The telescope is supported through the medium of long trunnions with bearings exactly corresponding in diameter to the telescope, these large bearings resting in the alidade in the same manner as the telescope rested before and being locked therein in the same manner. In this adjustment the telescope can be rocked freely on its bearings. The dotted lines in this figure show the extreme angles to which the telescope may be inclined. Fig. 3 is a plan view corresponding to Fig. 2, with the leveling-tube (now idle) and a portion of the tube of the telescope broken away. Figs. 4 and 5 are on a larger scale and show the trunnions detached. Fig. 4 is a plan view, and Fig. 5 a horizontal section.

Similar letters of reference indicate corresponding parts in all the figures where they appear.

A is a telescope, adapted to rest by its cylindrical bearings A' A' in the forked supports B B, carried in a horizontal revolving body or alidade D, which is capable of turning on a tapering central pivot in the ordinary manner. (Not shown.) The telescope is locked into the forks B, respectively, by curved levers C, capable of being readily secured and released in the long-approved or in any other suitable manner.

E is a rigid yoke surrounding the body A, at or near the center of gravity thereof, and having on each side an accurately-formed socket $e$, each having an internal screw-thread $e'$ and an accurately-formed conical seat $e^2$.

G G are stout trunnions, each having a screw-threaded end G' and an accurately-formed conical shoulder $G^2$, matching the conical seat $e^2$, and adapted to bear very firmly and reliably thereon when the trunnion is screwed home. Each trunnion has near its outer end a flange $G^3$ and a cylindrical bearing-surface $G^4$, the diameter of which latter is the same as that of the body of the telescope.

H is the ordinary long-approved leveling-tube, attached to the telescope in the ordinary or any suitable manner.

The central pivot of the alidade D is supported in a corresponding tubular sleeve O, which is equipped with four stiffly-connected leveling-arms P, adjusted by leveling-screws Q, engaging with the bottom plate W in the ordinary and long-approved manner.

T is a horizontal graduated ring, stiffly connected by arms T' below to a sleeve $T^2$, fitted on the exterior of the sleeve O, and adapted to be rotated thereon.

D' is an arm carried on the alidade D and matching against the inner periphery of the graduated ring T to allow the reading of the angle accurately. It will be understood that the telescope is provided with suitable adjustments for the eye-piece, the cross-hairs, &c., that the forks B and the leveling-tube H are provided with adjustments, and that the bottom plate W may be equipped with the refinements of support and adjustment common in instruments of this class.

When the instrument is used as a level, it serves in all respects in the ordinary and long-improved manner. The instrument being leveled, the telescope may be turned in any required position and the telescope may be reversed and the alidade correspondingly reversed to reduce the errors due to imperfections of the instrument. The long bearings afforded by the instrument allow the accuracy of determination of level for which the ordinary builder's level is greatly valued.

When it is desired to determine the vertical condition of a line, as the wall of the building, or to attain any other desired ends which require the telescope to be inclined, the following steps are taken: first, the trunnions are inserted in their sockets $e$ and turned until they are firmly set, the construction assuring that the trunnions shall come to rest exactly at right angles to the axis of the telescope. Then the levers C being detached the telescope is lifted out of its bearings in the forks B, so that the leveling-tube H is presented on the upper instead of the under side and swung horizontally, so that the bearings $G^4$ on the ends of the trunnions G rest in the forks B and the levers C are brought down upon the trunnion-bearings and locked. Now the telescope is free to rock on its bearings, so that it may sight an object at a considerable angle above or below the horizontal. Now directing the telescope to any portion, as the corner of a building, and locking the alidade in that position, the line of sight of the telescope may be traversed up and down the line and its correctness determined with great accuracy. The positions of windows or other points which should come directly over each other can be now determined with fineness.

When it is desired by this instrument to measure the extent of the horizontal angle between two objects in the same level or at different levels, the graduated ring T is brought into use. It is turned so that 0 or any other graduation coincides with the line of the telescope when directed toward one of the objects and locked, the telescope being then turned until it ranges at the other object, the alidade D, and consequently the vernier-arm D', travels with it. When the second position has been accurately attained, the angle may be read off from the graduated circle in the obvious manner.

The yoke E is made in two halves secured together by screws E', the upper part being the larger, and the two when properly applied together loosely embracing the tube A of the telescope, so that there is room for adjustment. The upper and main part of the yoke has short arms $E^2$ on each side, extending longitudinally of the telescope. Through each of these arms are tapped adjusting-screws F, which are set against the body of the tube A. By changing the adjustment of these screws the position of the yoke E, and consequently of the trunnions G, may be changed. This allows the trunnions to be adjusted to secure and maintain their position exactly at right angles to the axis of the telescope.

Modifications may be made without departing from the principle or sacrificing the advantages of the invention. I have shown two stops $D^2$ fitted on the alidade (see Figs. 1 and 2) in the positions to arrest the telescope when it has been elevated or depressed to the extent allowable. These may be omitted if the instrument is used with sufficient care.

When the angle at which the telescope is to be inclined is very little, the telescope may be mounted by its trunnions in the manner described and used without being inverted. In possible cases this may be an advantage by allowing the leveling-tube to perform its usual functions and the instrument be used, if required, as a level for a brief period without changing the adjustment.

I claim as an improvement in builders' levels—

1. The telescope A, provided with long trunnions having bearings $G^4$, adapted to engage in the same forks as the telescope, in combination with each other and with the forks B and alidade D, adapted to allow the instrument to be used at will as a level or as a transit, as herein specified.

2. In a builder's level, the long trunnions G $G^4$, made independent of the telescope and having screw-threads G', and accurately-finished shoulders $G^2$, in combination with the telescope A, having firmly-fixed sockets $e$, each with a hollow screw-thread $e'$ and accurately-finished seat $e^2$, adapted to be applied and removed as herein specified.

3. In a builder's level, the alidade D, forks B, telescope A, and long trunnions G, having bearings $G^4$ at their ends, in combination with each other and with the yoke E, loosely inclosing the telescope and provided with sockets $e$ and arms $E^2$, and with the adjusting-screws F, tapped through such arms and engaging with the telescope, as herein specified.

In testimony that I claim the invention above set forth I affix my signature in presence of two witnesses.

JOHN PAOLI.

Witnesses:
SUSAN B. PAOLI,
JOHN WHITE.